(12) United States Patent
Norin et al.

(10) Patent No.: US 9,942,618 B2
(45) Date of Patent: Apr. 10, 2018

(54) SMATV HEADEND USING IP TRANSPORT STREAM INPUT AND METHOD FOR OPERATING THE SAME

(75) Inventors: John L. Norin, Redondo Beach, CA (US); Richard B. Tatem, Middletown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 351 days.

(21) Appl. No.: 11/930,745

(22) Filed: Oct. 31, 2007

(65) Prior Publication Data

US 2009/0113492 A1   Apr. 30, 2009

(51) Int. Cl.
| | |
|---|---|
| H04N 7/20 | (2006.01) |
| H04N 21/643 | (2011.01) |
| H04N 21/214 | (2011.01) |
| H04N 21/222 | (2011.01) |
| H04N 21/2381 | (2011.01) |
| H04H 20/63 | (2008.01) |
| H04H 40/90 | (2008.01) |
| H04N 7/10 | (2006.01) |

(52) U.S. Cl.
CPC ... *H04N 21/64322* (2013.01); *H04N 21/2143* (2013.01); *H04N 21/2221* (2013.01); *H04N 21/2381* (2013.01); *H04H 20/63* (2013.01); *H04H 40/90* (2013.01); *H04N 7/106* (2013.01)

(58) Field of Classification Search
USPC .......... 725/63, 68, 78, 81, 85, 110; 709/238
See application file for complete search history.

(56) References Cited

U.S. PATENT DOCUMENTS

| | | |
|---|---|---|
| 3,581,209 A | 5/1971 | Zimmerman |
| 3,670,275 A | 6/1972 | Kalliomaki et al. |
| 4,064,460 A | 12/1977 | Gargini |

(Continued)

FOREIGN PATENT DOCUMENTS

| | | |
|---|---|---|
| DE | 10114082 A1 | 1/2003 |
| EP | 0288928 | 11/1988 |

(Continued)

OTHER PUBLICATIONS

Anonymous; "ANGA Sees European Launch of RGB Networks USM—The Cable Industry's Highest Density QAM Modulator"; IPTV Industry; May 22, 2007; XP002524087; Retrieved from the Internet: URL:http://www.iptv-industry.com/pr/6d.htm; the whole document.

(Continued)

*Primary Examiner* — Brian T Pendleton
*Assistant Examiner* — Alan Luong
(74) *Attorney, Agent, or Firm* — Harness, Dickey & Pierce, PLC

(57) ABSTRACT

A receiving unit 28 includes a tuner that receives a first signal that may include a satellite signal. A demodulator demodulates the satellite signal to form a second signal. The second signal may be internet protocol (IP) encapsulated to form an IP encapsulated signal. The IP encapsulated signal may be communicated through an IP network to a decoder. The decoder 144 decodes the second signal or the IP encapsulated signal. A modulator 146 modulates the decoded signal which is communicated to user devices through a network 147. In addition, IP encapsulated signals may also be communicated to various user devices through the network.

15 Claims, 5 Drawing Sheets

(56) References Cited

U.S. PATENT DOCUMENTS

| | | |
|---|---|---|
| 4,132,952 A | 1/1979 | Hongu et al. |
| 4,354,167 A | 10/1982 | Terreault et al. |
| 4,382,266 A | 5/1983 | Panzer |
| 4,397,037 A | 8/1983 | Theriault |
| 4,403,343 A | 9/1983 | Hamada |
| 4,509,198 A | 4/1985 | Nagatomi |
| 4,513,315 A | 4/1985 | Dekker et al. |
| 4,530,008 A | 7/1985 | McVoy |
| 4,532,543 A | 7/1985 | Groenewegen |
| 4,538,175 A | 8/1985 | Balbes et al. |
| 4,545,075 A | 10/1985 | Miller et al. |
| 4,556,988 A | 12/1985 | Yoshisato |
| 4,592,093 A | 5/1986 | Ouchi et al. |
| 4,608,710 A | 8/1986 | Sugiura |
| 4,628,506 A | 12/1986 | Sperlich |
| 4,656,486 A | 4/1987 | Turner |
| 4,663,513 A | 5/1987 | Webber |
| 4,667,243 A | 5/1987 | Blatter et al. |
| 4,672,687 A | 6/1987 | Horton et al. |
| 4,675,732 A | 6/1987 | Oleson |
| 4,710,972 A | 12/1987 | Hayashi et al. |
| 4,723,320 A | 2/1988 | Horton |
| 4,761,825 A | 8/1988 | Ma |
| 4,761,827 A | 8/1988 | Horton et al. |
| 4,785,306 A | 11/1988 | Adams |
| 4,802,239 A | 1/1989 | Ooto |
| 4,805,014 A | 2/1989 | Sahara et al. |
| 4,813,036 A | 3/1989 | Whitehead |
| 4,823,135 A | 4/1989 | Hirashima et al. |
| 4,860,021 A | 8/1989 | Kurosawa et al. |
| 4,866,787 A | 9/1989 | Olesen |
| 4,876,736 A | 10/1989 | Kiewit |
| 4,885,803 A | 12/1989 | Hermann et al. |
| 4,903,031 A | 2/1990 | Yamada |
| 4,945,410 A | 7/1990 | Walling |
| 5,010,400 A | 4/1991 | Oto |
| 5,027,430 A | 6/1991 | Yamauchi et al. |
| 5,058,138 A | 10/1991 | Figura et al. |
| 5,068,918 A | 11/1991 | Verheijen et al. |
| 5,073,930 A | 12/1991 | Green et al. |
| 5,119,509 A | 6/1992 | Kang |
| 5,235,619 A | 8/1993 | Beyers, II et al. |
| 5,249,043 A | 9/1993 | Grandmougin |
| 5,276,904 A | 1/1994 | Mutzig |
| 5,289,272 A | 2/1994 | Rabowsky et al. |
| 5,301,352 A | 4/1994 | Nakagawa et al. |
| 5,382,971 A | 1/1995 | Chanteau |
| 5,437,051 A | 7/1995 | Oto |
| 5,521,631 A | 5/1996 | Budow et al. |
| 5,565,805 A | 10/1996 | Nakagawa et al. |
| 5,572,517 A | 11/1996 | Safadi |
| 5,574,964 A | 11/1996 | Hamlin |
| 5,587,734 A | 12/1996 | Lauder et al. |
| 5,617,107 A | 4/1997 | Fleming |
| 5,649,318 A | 7/1997 | Lusignan |
| 5,675,390 A | 10/1997 | Schindler et al. |
| 5,708,961 A | 1/1998 | Hylton et al. |
| 5,734,356 A | 3/1998 | Chang |
| 5,742,680 A | 4/1998 | Wilson |
| 5,748,732 A | 5/1998 | Le Berre et al. |
| 5,760,819 A | 6/1998 | Sklar et al. |
| 5,760,822 A | 6/1998 | Coutinho |
| 5,787,335 A | 7/1998 | Novak |
| 5,790,202 A | 8/1998 | Kummer et al. |
| 5,793,413 A | 8/1998 | Hylton et al. |
| 5,805,806 A | 9/1998 | McArthur |
| 5,805,975 A | 9/1998 | Green et al. |
| 5,835,128 A | 11/1998 | MacDonald et al. |
| 5,838,740 A | 11/1998 | Kallman et al. |
| 5,848,239 A | 12/1998 | Ando |
| 5,864,747 A | 1/1999 | Clark et al. |
| 5,883,677 A | 3/1999 | Hofmann |
| 5,886,995 A | 3/1999 | Arsenault et al. |
| 5,898,455 A | 4/1999 | Barakat et al. |
| 5,905,941 A | 5/1999 | Chanteau |
| 5,905,942 A | 5/1999 | Stoel et al. |
| 5,923,288 A | 7/1999 | Pedlow, Jr. |
| 5,936,660 A | 8/1999 | Gurantz |
| 5,959,592 A | 9/1999 | Petruzzelli |
| 5,970,386 A * | 10/1999 | Williams ............... 725/69 |
| 5,982,333 A | 11/1999 | Stillinger et al. |
| 6,005,861 A | 12/1999 | Humpleman |
| 6,011,597 A | 1/2000 | Kubo |
| 6,023,603 A | 2/2000 | Matsubara |
| 6,038,425 A | 3/2000 | Jeffrey |
| 6,100,883 A | 8/2000 | Hoarty |
| 6,104,908 A | 8/2000 | Schaffner et al. |
| 6,112,232 A | 8/2000 | Shahar et al. |
| 6,134,419 A | 10/2000 | Williams |
| 6,147,714 A | 11/2000 | Terasawa et al. |
| 6,173,164 B1 | 1/2001 | Shah |
| 6,188,372 B1 | 2/2001 | Jackson et al. |
| 6,192,399 B1 | 2/2001 | Goodman |
| 6,198,449 B1 | 3/2001 | Muhlhauser et al. |
| 6,198,479 B1 | 3/2001 | Humpleman et al. |
| 6,202,211 B1 | 3/2001 | Williams, Jr. |
| 6,263,503 B1 | 7/2001 | Margulis |
| 6,292,567 B1 | 9/2001 | Marland |
| 6,304,618 B1 | 10/2001 | Hafeez et al. |
| 6,340,956 B1 | 1/2002 | Bowen et al. |
| 6,397,038 B1 | 5/2002 | Green, Sr. et al. |
| 6,424,817 B1 | 7/2002 | Hadden |
| 6,430,233 B1 | 8/2002 | Dillon et al. |
| 6,430,742 B1 | 8/2002 | Chanteau |
| 6,441,793 B1 | 8/2002 | Shea |
| 6,441,797 B1 | 8/2002 | Shah |
| 6,442,148 B1 | 8/2002 | Adams et al. |
| 6,452,991 B1 | 9/2002 | Zak |
| 6,463,266 B1 | 10/2002 | Shohara |
| 6,486,907 B1 | 11/2002 | Farber et al. |
| 6,493,873 B1 | 12/2002 | Williams |
| 6,493,874 B2 | 12/2002 | Humpleman |
| 6,501,770 B2 | 12/2002 | Arsenault et al. |
| 6,510,152 B1 | 1/2003 | Gerszberg et al. |
| 6,549,582 B1 | 4/2003 | Friedman |
| 6,574,235 B1 | 6/2003 | Arslan et al. |
| 6,598,231 B1 | 7/2003 | Basawapatna et al. |
| 6,600,897 B1 | 7/2003 | Watanabe et al. |
| 6,622,307 B1 | 9/2003 | Ho |
| 6,647,015 B2 | 11/2003 | Malkemes et al. |
| 6,653,981 B2 | 11/2003 | Wang et al. |
| 6,678,737 B1 | 1/2004 | Bucher |
| 6,728,513 B1 | 4/2004 | Nishina |
| 6,762,727 B2 | 7/2004 | Rochford et al. |
| 6,864,855 B1 | 3/2005 | Fujita |
| 6,865,193 B2 | 3/2005 | Terk |
| 6,868,255 B1 * | 3/2005 | Chanteau et al. .......... 455/12.1 |
| 6,879,301 B2 | 4/2005 | Kozlovski |
| 6,889,385 B1 | 5/2005 | Rakib et al. |
| 6,906,673 B1 | 6/2005 | Matz et al. |
| 6,941,576 B2 | 9/2005 | Amit |
| 6,944,878 B1 | 9/2005 | Wetzel et al. |
| 7,010,265 B2 | 3/2006 | Coffin, III |
| 7,016,643 B1 | 3/2006 | Kuether et al. |
| 7,020,081 B1 | 3/2006 | Tani et al. |
| 7,039,169 B2 | 5/2006 | Jones |
| 7,069,574 B1 | 6/2006 | Adams et al. |
| 7,085,529 B1 | 8/2006 | Arsenault et al. |
| 7,130,576 B1 | 10/2006 | Gurantz et al. |
| 7,239,285 B2 | 7/2007 | Cook |
| 7,240,357 B1 | 7/2007 | Arsenault et al. |
| 7,245,671 B1 | 7/2007 | Chen et al. |
| 7,257,638 B2 | 8/2007 | Celik et al. |
| 7,260,069 B2 | 8/2007 | Ram et al. |
| 7,263,469 B2 | 8/2007 | Bajgrowicz et al. |
| 7,313,810 B1 * | 12/2007 | Bell ............... H04H 20/103 |
| | | 348/E7.063 |
| 7,369,750 B2 | 5/2008 | Cheng et al. |
| 7,519,680 B1 | 4/2009 | O'Neil |
| 7,522,875 B1 | 4/2009 | Gurantz et al. |
| 7,542,715 B1 | 6/2009 | Gurantz et al. |
| 7,546,619 B2 | 6/2009 | Anderson et al. |
| 7,603,022 B2 | 10/2009 | Putterman et al. |
| 7,634,250 B1 | 12/2009 | Prasad et al. |

(56) References Cited

U.S. PATENT DOCUMENTS

| | | |
|---|---|---|
| 7,890,552 B2 | 2/2011 | Reichman |
| 7,970,341 B2 | 6/2011 | Fitzpatrick et al. |
| 8,001,574 B2 | 8/2011 | Hicks et al. |
| 2001/0055319 A1 | 12/2001 | Quigley et al. |
| 2002/0019984 A1* | 2/2002 | Rakib .................. 725/111 |
| 2002/0026645 A1 | 2/2002 | Son et al. |
| 2002/0044614 A1 | 4/2002 | Molnar |
| 2002/0046406 A1 | 4/2002 | Chelehmal et al. |
| 2002/0116707 A1 | 8/2002 | Morris et al. |
| 2002/0140617 A1 | 10/2002 | Luly et al. |
| 2002/0152467 A1 | 10/2002 | Fiallos |
| 2002/0154055 A1 | 10/2002 | Davis et al. |
| 2002/0154620 A1 | 10/2002 | Azenkot et al. |
| 2002/0163911 A1 | 11/2002 | Wee et al. |
| 2002/0178454 A1 | 11/2002 | Antoine et al. |
| 2002/0181604 A1 | 12/2002 | Chen |
| 2003/0023978 A1 | 1/2003 | Bajgrowicz |
| 2003/0053562 A1 | 3/2003 | Busson et al. |
| 2003/0097563 A1 | 5/2003 | Moroney et al. |
| 2003/0129960 A1 | 7/2003 | Kato |
| 2003/0185174 A1 | 10/2003 | Currivan |
| 2003/0192053 A1* | 10/2003 | Sheppard et al. ........... 725/81 |
| 2003/0217362 A1 | 11/2003 | Summers et al. |
| 2003/0220072 A1 | 11/2003 | Coffin, III |
| 2004/0006772 A1 | 1/2004 | Ansari et al. |
| 2004/0060065 A1 | 3/2004 | James et al. |
| 2004/0064689 A1 | 4/2004 | Carr |
| 2004/0068747 A1 | 4/2004 | Robertson et al. |
| 2004/0107436 A1 | 6/2004 | Ishizaki |
| 2004/0123329 A1 | 6/2004 | Williams et al. |
| 2004/0136455 A1 | 7/2004 | Akhter et al. |
| 2004/0153942 A1 | 8/2004 | Shtutman et al. |
| 2004/0161031 A1 | 8/2004 | Kwentus et al. |
| 2004/0163125 A1* | 8/2004 | Phillips et al. ............ 725/119 |
| 2004/0172658 A1 | 9/2004 | Rakib et al. |
| 2004/0184521 A1 | 9/2004 | Chen et al. |
| 2004/0192190 A1 | 9/2004 | Motoyama |
| 2004/0198237 A1 | 10/2004 | Abutaleb et al. |
| 2004/0203425 A1 | 10/2004 | Coffin |
| 2004/0214537 A1 | 10/2004 | Bargroff et al. |
| 2004/0229583 A1 | 11/2004 | Ogino |
| 2004/0244044 A1 | 12/2004 | Brommer |
| 2004/0244059 A1 | 12/2004 | Coman |
| 2004/0250273 A1 | 12/2004 | Swix et al. |
| 2004/0252243 A1 | 12/2004 | Stewart |
| 2004/0255229 A1 | 12/2004 | Shen et al. |
| 2004/0261110 A1 | 12/2004 | Kolbeck et al. |
| 2004/0268408 A1 | 12/2004 | Lee et al. |
| 2005/0002640 A1 | 1/2005 | Putterman et al. |
| 2005/0033846 A1 | 2/2005 | Sankaranarayan et al. |
| 2005/0052335 A1 | 3/2005 | Chen |
| 2005/0054315 A1 | 3/2005 | Bajgrowicz et al. |
| 2005/0057428 A1 | 3/2005 | Fujita |
| 2005/0060525 A1 | 3/2005 | Schwartz et al. |
| 2005/0066367 A1 | 3/2005 | Fyke et al. |
| 2005/0071877 A1 | 3/2005 | Navarro |
| 2005/0071882 A1 | 3/2005 | Rodriguez et al. |
| 2005/0089168 A1 | 4/2005 | Kahre |
| 2005/0118984 A1 | 6/2005 | Akiyama et al. |
| 2005/0130590 A1 | 6/2005 | Pande et al. |
| 2005/0138663 A1 | 6/2005 | Throckmorton et al. |
| 2005/0184923 A1 | 8/2005 | Saito et al. |
| 2005/0190777 A1 | 9/2005 | Hess et al. |
| 2005/0193419 A1 | 9/2005 | Lindstrom et al. |
| 2005/0198673 A1 | 9/2005 | Kit |
| 2005/0204388 A1 | 9/2005 | Knudson et al. |
| 2005/0216937 A1 | 9/2005 | Shintani et al. |
| 2005/0229206 A1 | 10/2005 | Pugel et al. |
| 2005/0240969 A1 | 10/2005 | Sasaki et al. |
| 2005/0264395 A1 | 12/2005 | Bassi |
| 2005/0289605 A1 | 12/2005 | Jeon |
| 2006/0018345 A1 | 1/2006 | Nadarajah et al. |
| 2006/0030259 A1 | 2/2006 | Hetzel et al. |
| 2006/0041912 A1 | 2/2006 | Kuhns |
| 2006/0041925 A1 | 2/2006 | Suh |
| 2006/0048202 A1 | 3/2006 | Bontempi et al. |
| 2006/0080707 A1 | 4/2006 | Laksono |
| 2006/0112407 A1 | 5/2006 | Kakiuchi |
| 2006/0126551 A1 | 6/2006 | Delaunay et al. |
| 2006/0133612 A1 | 6/2006 | Abedi et al. |
| 2006/0143673 A1 | 6/2006 | Okamoto |
| 2006/0174282 A1 | 8/2006 | Dennison et al. |
| 2006/0225104 A1 | 10/2006 | James et al. |
| 2006/0259929 A1 | 11/2006 | James et al. |
| 2006/0271954 A1* | 11/2006 | Lankford et al. ............ 725/40 |
| 2006/0294512 A1 | 12/2006 | Seiden |
| 2007/0033621 A1 | 2/2007 | Roeck |
| 2007/0083898 A1 | 4/2007 | Norin et al. |
| 2007/0101398 A1* | 5/2007 | Islam .................. 725/151 |
| 2007/0107019 A1 | 5/2007 | Romano et al. |
| 2007/0115933 A1 | 5/2007 | Muhamed et al. |
| 2007/0162928 A1 | 7/2007 | Mickle et al. |
| 2007/0164609 A1 | 7/2007 | Shalam et al. |
| 2007/0202800 A1 | 8/2007 | Roberts et al. |
| 2007/0266414 A1 | 11/2007 | Kahn et al. |
| 2008/0009251 A1 | 1/2008 | Wahl et al. |
| 2008/0022322 A1 | 1/2008 | Grannan et al. |
| 2008/0040767 A1* | 2/2008 | McCarthy .......... H04N 7/17318 725/132 |
| 2008/0064355 A1 | 3/2008 | Sutskover et al. |
| 2008/0066095 A1* | 3/2008 | Reinoso .................. 725/28 |
| 2008/0077425 A1* | 3/2008 | Johnson ............ G06Q 10/103 705/301 |
| 2008/0109854 A1* | 5/2008 | Casavant et al. ............ 725/68 |
| 2008/0127277 A1* | 5/2008 | Kuschak ............ H04H 60/80 725/74 |
| 2008/0134279 A1 | 6/2008 | Curtis et al. |
| 2008/0205514 A1 | 8/2008 | Nishio et al. |
| 2008/0301748 A1 | 12/2008 | Lida et al. |
| 2009/0013358 A1 | 1/2009 | Throckmorton et al. |
| 2009/0070442 A1 | 3/2009 | Kacin |
| 2009/0141735 A1 | 6/2009 | Kolhi |
| 2009/0150937 A1 | 6/2009 | Ellis et al. |
| 2009/0222875 A1 | 9/2009 | Cheng et al. |
| 2009/0252316 A1 | 10/2009 | Ratmanski et al. |
| 2009/0278992 A1* | 11/2009 | Gutknecht et al. ........... 348/706 |
| 2009/0320055 A1 | 12/2009 | Langille et al. |
| 2009/0320058 A1* | 12/2009 | Wehmeyer et al. ........... 725/31 |
| 2010/0313238 A1 | 12/2010 | Baumgartner et al. |
| 2011/0128378 A1* | 6/2011 | Raji ................. G06F 17/30873 348/143 |

FOREIGN PATENT DOCUMENTS

| | | |
|---|---|---|
| EP | 1447987 | 8/2004 |
| GB | 2127257 | 4/1984 |
| GB | 2377111 | 12/2002 |
| JP | 57193190 | 11/1982 |
| JP | 59-211380 | 11/1984 |
| JP | 60153225 | 8/1985 |
| JP | 60165832 | 8/1985 |
| JP | 61195094 | 8/1986 |
| JP | 61238130 | 10/1986 |
| JP | 62026933 | 2/1987 |
| JP | 62-279785 | 12/1987 |
| JP | 02054637 | 8/1988 |
| JP | 01-255389 | 10/1989 |
| JP | 01-256823 | 10/1989 |
| JP | 2140022 | 5/1990 |
| JP | 02209026 | 8/1990 |
| JP | 03058521 | 3/1991 |
| JP | 11355076 A | 12/1999 |
| JP | 2001-231033 | 2/2000 |
| JP | 2001237752 | 8/2001 |
| JP | 2003339030 | 11/2003 |
| WO | 02/25847 A1 | 3/2002 |
| WO | 03094520 | 11/2003 |

(56) References Cited

FOREIGN PATENT DOCUMENTS

| | | |
|---|---|---|
| WO | 2004054157 A2 | 6/2004 |
| WO | 2007050081 | 5/2007 |
| WO | 2008/057487 A2 | 5/2008 |

OTHER PUBLICATIONS

Anonymous; "Continuum DVP Dense QAM Array for Video-on-Demand Delivery"; Scientific Atlanta; Jun. 30, 2002; XP002524543; Retrieved from the Internet: URL:http://www.scientificatlanta.com/customers/source/7000183.pdf; the whole document.
International Search Report and Written Opinion dated May 7, 2009 in International Application No. PCT/US2008/082138 filed Oct. 31, 2008 by John L. Norin et al.
EPO Communication dated Oct. 20, 2010 in European Patent Application No. 08845359.2 filed Oct. 31, 2008 by John L. Norin et al.
Non-final Office action dated Mar. 15, 2011 in U.S. Appl. No. 11/820,446, filed Jun. 19, 2007 by Thomas H. James et al.
Chinese Office action dated Sep. 15, 2011 in Chinese Patent Application No. 200880114021.9 filed Oct. 31, 2008 by John L. Norin et al.
Final Rejection dated Jun. 21, 2010 in U.S. Appl. No. 11/219,247, filed Sep. 2, 2005 by Thomas H. James et al.
Final Rejection dated Jul. 21, 2010 in U.S. Appl. No. 11/219,407, filed Sep. 2, 2005 by Thomas H. James et al.
European Telecommunications Satellite Organization (EUTELSAT); "Digital Satellite Equipment Control (DiSEqC): Application Information for Tuner-Receivers/IRDs"; Apr. 12, 1996; pp. 1-25.
Final Rejection dated Jan. 31, 2011 in U.S. Appl. No. 11/820,205, filed Jun. 18, 2007 by Hanno Basse et al.
Non-final Office action dated Feb. 18, 2011 in U.S. Appl. No. 12/195,256, filed Aug. 20, 2008 by Robert F. Popoli.
Final Rejection dated Jan. 20, 2011 in U.S. Appl. No. 11/603,637, filed Nov. 22, 2006 by Jorge Guzman et al.
Notice of Allowance dated Feb. 17, 2011 in U.S. Appl. No. 11/097,615, filed Apr. 1, 2005 by Thomas H. James et al.
Notice of Allowance dated Jan. 10, 2011 in U.S. Appl. No. 11/097,479, filed Apr. 1, 2005 by Thomas H. James et al.
Notice of Allowance dated Feb. 2, 2011 in U.S. Appl. No. 11/097,480, filed Apr. 1, 2005 by Thomas H. James et al.
Notice of Allowance dated Dec. 23, 2010 in U.S. Appl. No. 11/219,418, filed Sep. 2, 2005 by Thomas H. James et al.
EPO Communication dated Aug. 19, 2010 in European Patent Application No. 06749155.5 filed Apr. 3, 2006 by Thomas H. James et al.
STMicroelectronics; "Extension of the DiseqC 1 Standard for Control of Satellite Channel Router Based One-Cable LNBs"; Application Note; Oct. 5, 2004; pp. 1-12; XP002399973.
EPO Communication dated Aug. 19, 2010 in European Patent Application No. 06740394.9 filed Apr. 3, 2006 by Thomas H. James et al.
EPO Communication dated Aug. 16, 2010 in European Patent Application No. 06749160.5 filed Apr. 3, 2006 by Thomas H. James et al.
Non-final Office action dated Aug. 31, 2010 in U.S. Appl. No. 11/097,615, filed Apr. 1, 2005 by Thomas H. James et al.
Final Rejection dated Jan. 12, 2011 in U.S. Appl. No. 11/810,774, filed Jun. 7, 2007 by Hanno Basse et al.
Non-final Office action dated Aug. 13, 2010 in U.S. Appl. No. 11/820,205, filed Jun. 18, 2007 by Hanno Basse et al.
Final Rejection dated Mar. 29, 2010 in U.S. Appl. No. 11/097,480, filed Apr. 1, 2005 by Thomas H. James et al.
EPO Communication dated Jul. 6, 2010 in European Patent Application No. 06749159.7 filed Apr. 3, 2006 by Thomas H. James et al.
Non-final Office action dated Jun. 23, 2010 in U.S. Appl. No. 11/820,446, filed Jun. 19, 2007 by Thomas H. James et al.
European Telecommunications Satellite Organization (EUTELSAT); Digital Satellite Equipment Control (DiSEqC); Application Information for Tuner-Receivers/IRDs; Apr. 12, 1996; pp. 1-25.
Anonymous; "Motorola SmartStream Encryptor Modulator"; Jul. 1, 2003; XP55008043; retrieved from the Internet: URL:http://broadband.motorola.com/catalog/product_documents/SEM_wp_july03.pdf [retrieved on Sep. 26, 2011].
European Telecommunications Standards Institute (ETSI); "HFC (Cable TV) Access Networks; Part 1: Interworking the PSTN, N-ISDN, Internet and Leased lines Networks [Network aspects]"; ETSI Draft; TD05M; 650 Route Des Lucioles, F-06921 Sophia-Antipolis, France; No. V1.1.1; Oct. 9, 1998; pp. 1-41; XP014057863; [retrieved on Oct. 9, 1998].
EPO Summons to oral proceedings dated Nov. 25, 2011 in European Patent Application No. 08845359.2 filed Oct. 31, 2008 by John L. Norin et al.
Non-final Office action dated Oct. 19, 2012 in U.S. Appl. No. 13/223,204, filed Aug. 31, 2011 by John Norin et al.
Notice of Allowance dated Dec. 19, 2013 in U.S. Appl. No. 11/863,962, filed Sep. 28, 2007 by Scott D. Casavant et al.
EPO Communication dated Jul. 26, 2013 in European Patent Application No. 12169889.8 filed Oct. 31, 2008 by John L. Norin et al.
Final Rejection dated Mar. 28, 2013 in U.S. Appl. No. 13/223,204, filed Aug. 31, 2011 by John Norin et al.
Final Rejection dated Feb. 13, 2013 in U.S. Appl. No. 11/863,962, filed Sep. 28, 2007 by Scott D. Casavant et al.
STMicroelectronics; "SaTCR-1 Satellite Channel Router"; Oct. 1, 2004; XP055133313; retrieved from the internet URL:http://www.st.com/st-web-ui/static/active/en/resource/technical/document/data_brief/CD00022121.pdf [retrieved on Aug. 5, 2014].
Final Rejection dated Mar. 13, 2014 in U.S. Appl. No. 13/223,204, filed Aug. 31, 2011 by John L. Norin et al.
Final Rejection dated Feb. 28, 2012 in U.S. Appl. No. 11/863,962, filed Sep. 28, 2007 by Scott D. Casavant et al.

\* cited by examiner

SMATV HEADEND USING IP TRANSPORT STREAM INPUT AND METHOD FOR OPERATING THE SAME

TECHNICAL FIELD

The present disclosure relates generally to satellite television systems and, more particularly, to a satellite television system having acting as a local head end to distribute various channels throughout a building.

BACKGROUND

Satellite television has become increasingly popular due to its wide variety of programming. Typical satellite receivers are designed as one integrated unit. That is, the various tuning functions, conditional access functions and processing are all performed on the same circuit board.

For certain types of applications, an IP encapsulated bitstream is desirable. The IP bitstream is distributed to various monitors for playback. The IP solutions are typically targeted at large installations to support hundreds of simultaneous users. Such systems are typically not economical for low-end installation requiring only a modest number of receivers. Such applications include low-end commercial applications such as bars, waiting rooms and single-family homes. A set top box capable of converting the IP stream to usable signals typically requires a box. In certain applications not requiring a set top box would reduce the cost of the system. Providing some basic service to applications such as multiple dwelling units is also desirable.

Hotels and other applications may also use a satellite master antenna television (SMATV) system. Hotels do not typically employ specialized personnel to fix problems. Thus, service calls to such locations may be made often.

SUMMARY OF THE DISCLOSURE

In one aspect of the disclosure, a system includes a tuner module tuning a satellite signal, a demodulator demodulating the satellite signal to form a transport stream signal, a decoder module decoding the transport stream signal to form an analog signal and a modulator modulating the analog signal and communicating the modulated signal to a television tuner.

In a further aspect of the disclosure, a system includes a tuner module tuning a satellite signal, a demodulator demodulating the satellite signal to form a transport stream signal, an IP encapsulation module receiving the transport stream and formatting the transport stream signal to form an IP encapsulated signal and communicating the IP encapsulated signal through the network. The encapsulated signal is decoded/decrypted by a device to form an analog signal. The analog signal is modulated and communicated to a tuner within a viewing device.

In yet another aspect of the disclosure, a method includes receiving a first signal to form a received signal, demodulating the received signal to form a transport stream signal, decoding the transport stream signal to form an analog signal and modulating the analog signal to from a modulated signal and communicating the modulated signal to a television tuner through a network.

The system in one configuration allows a basic service using modulated analog signals to be provided to customers. Enhanced service is also possible when incorporating IP streams into the system.

The system may be formed using various circuit boards so that the system may be expanded or upgraded without having to upgrade other circuit boards. When multiple circuit boards are used, the higher volume application allows the circuit boards to be manufactured at a reduced cost. This also helps reduce the overall cost of maintenance of the system.

The system may also be used for monitoring various aspects of the system and controlling various aspects of the system remotely. This will reduce the number of service calls for the system.

Other features of the present disclosure will become apparent when viewed in light of the detailed description of the preferred embodiment when taken in conjunction with the attached drawings and appended claims.

DETAILED DESCRIPTION

Figure 1:
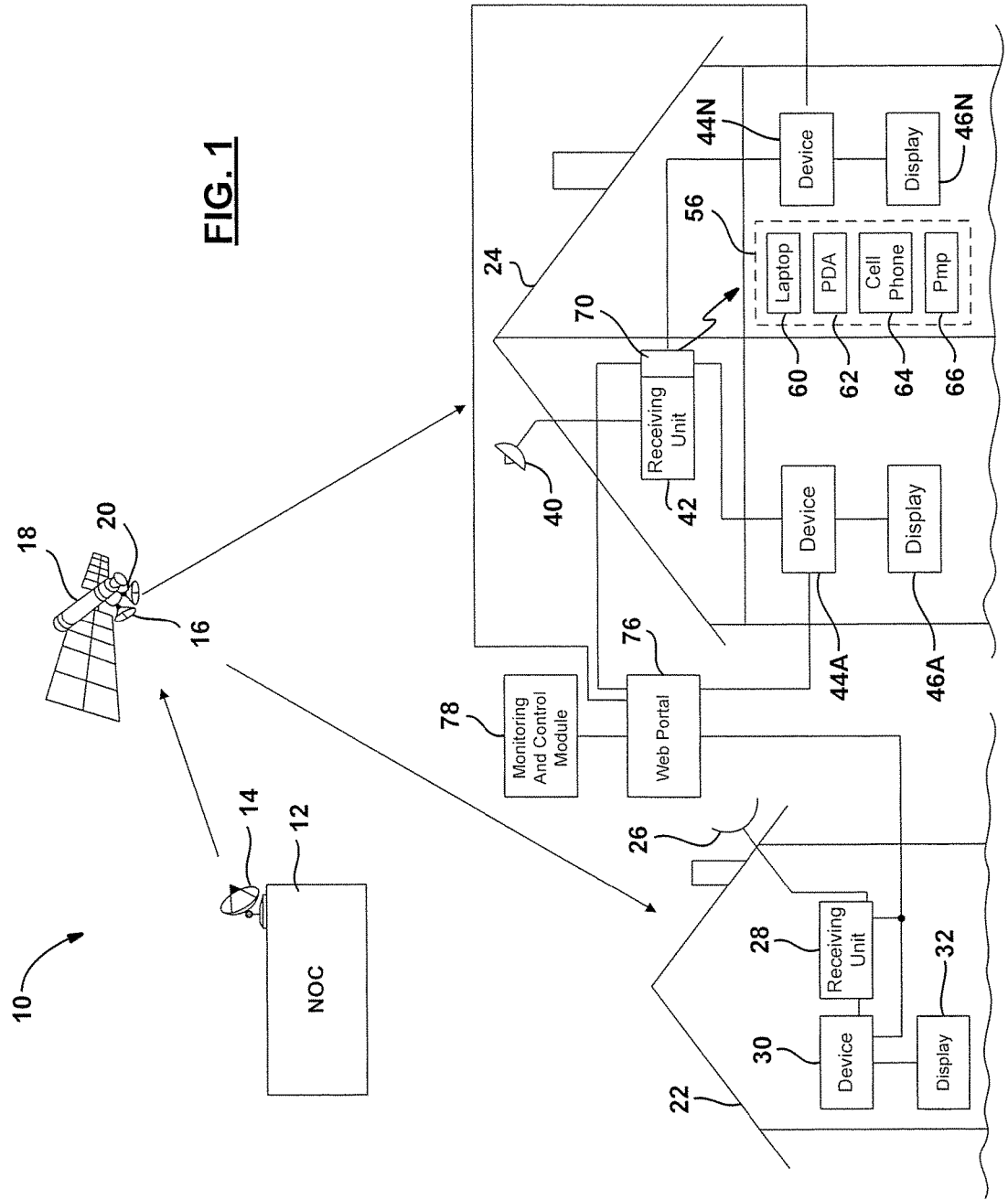
FIG. 1 is a system level view of a satellite broadcasting system according to the present disclosure.

In the following figures the same reference numerals will be used for the same views. The following figures are described with respect to a satellite television system. However, those skilled in the art will recognize that the teachings of the present disclosure may be applied to various types of systems including a cable system.

As used herein, the term module refers to an Application Specific Integrated Circuit (ASIC), an electronic circuit, a processor (shared, dedicated, or group) and memory that executes one or more software or firmware programs, a combinational logic circuit, and/or other suitable components that provide the described functionality. As used herein, the phrase or at least one of A, B, and C should be construed to mean a logical (A or B or C), using a non-exclusive logical OR. It should be understood that steps within a method may be executed in different order without altering the principles of the present disclosure.

Referring now to FIG. 1, a satellite television broadcasting system 10 is illustrated. The satellite television broadcasting system 10 includes a network operations center 12 that generates wireless uplink signals through a transmitting antenna 14 which are received by a receiving antenna 16 of a satellite 18. The wireless signals, for example, may be digital. A transmitting antenna 20 generates wireless downlink signals directed to various receiving systems including stationary systems such as those in a home 22 as well as multiple dwelling units and commercial buildings 24. Commercial buildings may include hotels. The wireless signals may have various types of information associated with them including various channel information such as a channel guide, metadata, location information and the like. The wireless signals may also have various video and audio signal information associated therewith.

The home 22 includes a receiving antenna 26 that receives the wireless signals from the satellite 18 and processes the signals in a receiving unit 28. An IP encapsulated bitstream is generated at the receiving unit 28. In addition to or instead of the IP encapsulated signal, the receiving unit 28 may also generate an analog output signal or several signals corresponding to various channels. A device 30 receives the IP encapsulated bitstream and controls a display 32 in response to the bitstream. The display 32 may include both an audio and a video display. The receiving unit 28 will be described in further detail below.

As was mentioned above, the system may also apply to a cable or wired system. In such a case, the antenna 26 would be replaced with a cable connection. The system may also be used in a terrestrial broadcast system. In such a case, the satellite antenna 18 would be replaced by a terrestrial signal receiving antenna.

Building 24 includes a receiving antenna 40 that receives the wireless signals from the satellite 18 and processes the signals in a receiving unit 42. An IP encapsulated bitstream is generated at the receiving unit 42. In addition to or instead of the IP encapsulated signal, the receiving unit 42 may also generate an analog output signal or several signals corresponding to various channels. A plurality of devices 44A-44N in communication with the receiving unit 42 receives the IP encapsulated bitstream or the analog signals or both and controls a display 46A-46N in response to the bitstream. The displays 46A-46N may include either an audio or a video display, or both. The devices 44A-N may include a decoder for decoding the IP signal (MPEG signal) for use by the display device. The devices 44A-N may also include video and audio output drivers to control displays 46A-46N.

The present disclosure may also be used for displaying various wireless information on a personal mobile device 56, such as a laptop computer 60, a personal digital assistant 62, a cellular telephone 64 or a portable media device 66. It should be noted that the personal mobile devices 56 may receive wireless signals having various types of information from a router 70 that is in communication with the receiving device 42. The router 70 may be wireless.

The router 70 may also be a wired router for distributing signals to the plurality of devices 44A-44N. The router 70 may be an independent unit or incorporated into the receiving unit 42. A router 70 may also be an optional feature depending on the system.

Because an IP network may be provided, a web portal 76 may be in communication with the receiving unit 42, and more specifically to the router 70. A web portal 76 may also be in communication with one of the devices 44A, 44N and the receiving unit 28. A monitoring and control module 78 may be used to monitor and control one or more of the receiving unit 28, the receiving unit 42, the router 70 and the device 4A, 44N. The monitoring and control module 78 may receive monitoring signals as to the health and status of the various devices mentioned above. Control signals may be generated from the monitoring and control module 78 to control the various devices. Various controls may include resetting the devices or reconfiguring the devices based upon various control or monitored signals. For example, should a box reset be required, a control signal may be generated by the monitoring and control module 78 and communicated to one of the devices mentioned above.

Figure 2:
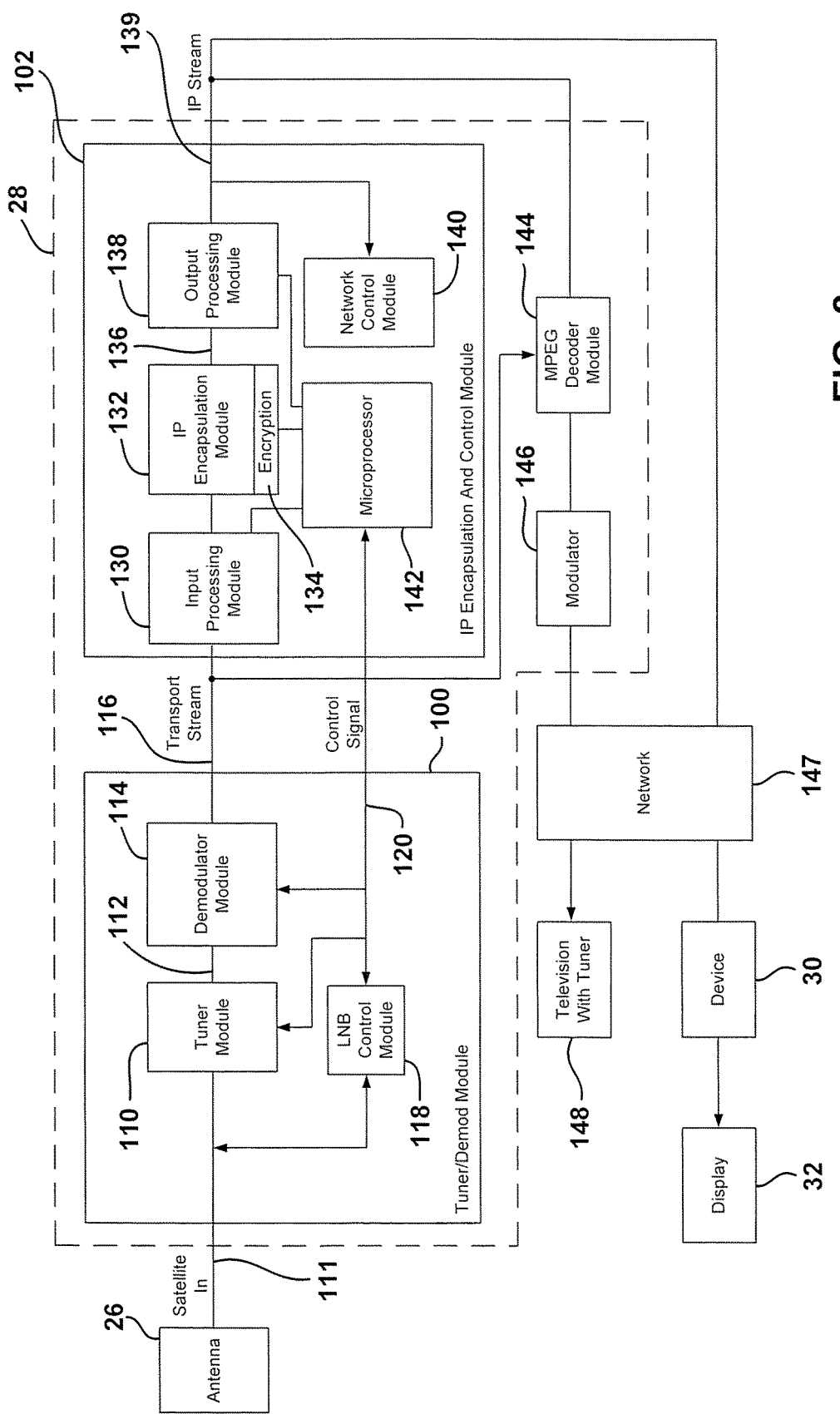
FIG. 2 is a detailed block diagrammatic view of a receiving unit.

Referring now to FIG. 2, a receiving unit 28 is illustrated in further detail. Antenna 26 may be various types of antennas. The antenna 26 may be a single antenna used for satellite television reception, or a number of antennas. The antenna 26 may also be an electronic antenna.

The circuitry may be formed as a plurality of discrete components formed on one or many circuit boards. In the present example, the receiving unit 28 may include a tuner demodulator module 100 formed on a first circuit board and an IP encapsulation and control module 102 formed on a second circuit board. The circuit boards may contain the components of their respective module. The circuit boards may be spaced apart and a connector, bus or communication link may be used to interconnect the modules.

The tuner demodulator module 100 includes a tuner 110 that receives the signal or the satellite signal 111 for the selected channel and generates a tuner signal 112. The tuner signal 112 is provided to a demodulator module 114 that demodulates the tuner signal 112 to form a demodulated signal or transport stream 116. The transport stream may be in various formats may include but are not limited to MPEG such as MPEG2 and DIRECTV® legacy format.

A low noise block (LNB) control module 118 is in communication with the tuner module 110 and the demodulator module 114. The LNB control module 118 may control the tuner and demodulator functions according to received control signals 120. For example, the LNB control module 118 may switch the LNB contained in the antenna 26 to receive the proper signal requested by the IP encapsulation and control module 102. Further, guide data or conditional access data and other information may be requested from the IP encapsulation and control module and provided for in the low noise block control module 118. The LNB control module 118 may be used for powering the outdoor unit (the antenna 26) and selecting the particular orbital location if needed.

The IP encapsulation and control module 102 includes an input processing module 130. The input processing module 130 may act as a buffer for buffering the transport stream signal 116. The input processing module 130 also acts as a filter passing only those packets needed by downstream devices 30 or 44 and discarding the packets that are not needed by downstream devices.

An IP encapsulation module 132 receives the transport stream and repackages it using an internet protocol (IP) to form an IP encapsulated signal 136. Additional network control messages may also be inserted by the IP encapsulation module 132. The IP encapsulation module 132 may provide various information in the form of a packet header. The packet header may include information such as the destination IP address, the source IP address, the type of protocol, various flags, check sums, metadata such as channel information, ratings, and the like. Various types of transport packets may be real time protocol (RTP) formed depending on the desired characteristics of the system. TCP, UDP, DCCP, SCTP, RTP, RTSP streaming of control protocol and the like may be used. An encryption module 134 may encrypt the encapsulated signal 136.

The IP encapsulated signal 136 is communicated to output processing module 138. The encryption module 134 is an optional module that may be separate from the IP encapsulation module 132 or included therein. The output processing module 138 may also act as a buffer for buffering output to the device 30. The output of 138 is IP stream 139.

A network control module 140 is used to monitor the IP network and accept commands from downstream equipment requesting channel changes, guide data, conditional access data and the like. The network control module 140 manages the aspects of the IP data sent to and from the system into the IP network.

A microprocessor 142 is in communication with the input processing module 130, the IP encapsulation module 132, the output processing module 138, and the network control module 140. The microprocessor 142 also generates control signals to the LNB control module 118 of the tuner demodulator module 100. The microprocessor 142 may also be in direct communication with the tuner module 110 and the demodulator module 114. The control protocol may include I²C industry standard or various other types of industry standards or custom standards suitable for this application.

The IP stream 139 may also be communicated to an MPEG decoder module 144. The MPEG decoder module 144 may actually consist of a plurality of decoder modules used for receiving the IP stream and converting it to an audio and video signal. For example, separate MPEG decoder modules 144 may be used to generate various signals corresponding to various channels. That is, one audio and video signal may be provided for each of the channels. In this example, only channel may be provided. The output of the MPEG decoder module 144 is an analog signal that may be modulated at a modulator 146. The modulator 146 communicates the modulated signal through a cable connected to a television with a tuner 148. Preferably, the signals are modulated in a frequency that is tunable by a cable-ready tuner within the television 148. This embodiment is merely representative of a single channel. However, several channels may also be provided as is set forth in FIG. 4.

One thing to note is that both an IP stream and a modulated analog stream may be provided. The two streams may be provided over the same distribution 147 network. A modulated stream may be for a low-end service, while the IP stream may be for a higher premium-type service. This example will be further described in FIG. 4 below.

It should also be noted that the transport stream, if already an MPEG or other suitable format, may be provided directly to the MPEG decoder module 144 from the demodulator module 114.

The network 147 may be used to communicate the IP encapsulated signals, i.e., the IP stream, the modulated signals or both. As mentioned above, some basic channels may be provided to users in the system using the modulated signals, while enhanced service may be provided with the IP service. The network 147 may be a wired network or a wireless network. The wired network may be an existing coaxial cable system using coaxial wires or other infrastructure optical units such as CAT5E, multimode or single mode fibers.

Figure 3:
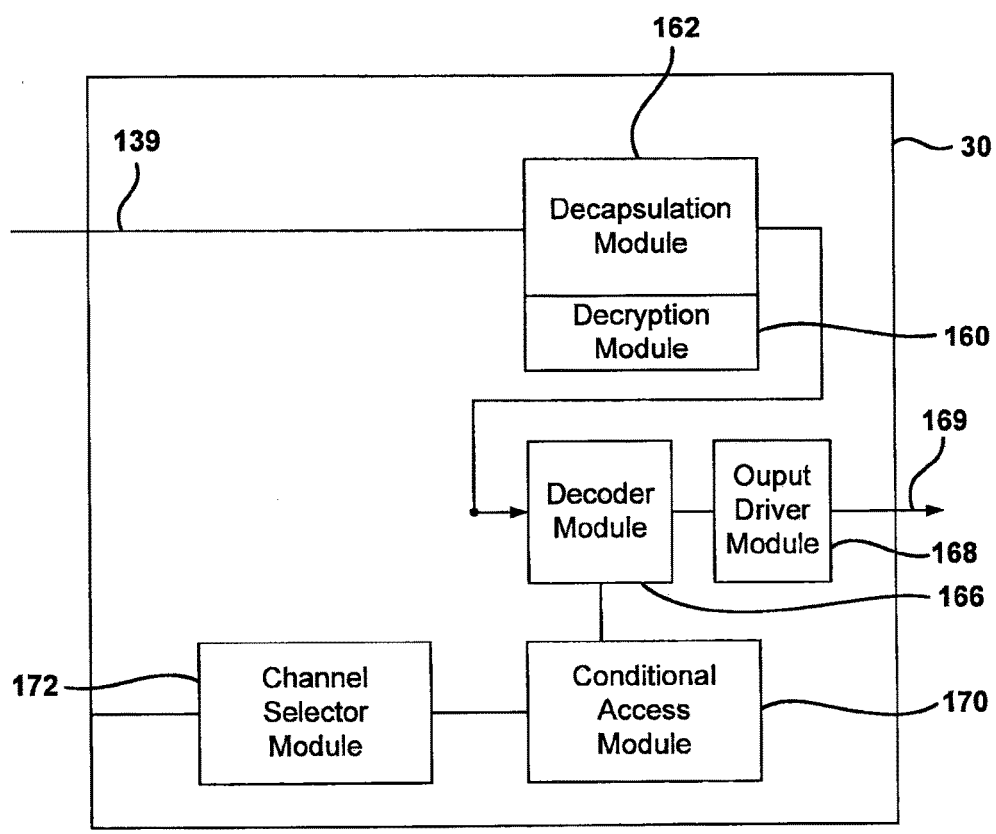
FIG. 3 is a block diagrammatic view of a device.

Referring now to FIG. 3, a device 30 is illustrated in further detail. Device 30 may include a decryption module 160 if encryption is performed in the receiving unit 28. Decryption module 160 may not be included in a device 30 should the receiving device not include encryption.

A decapsulation module 162 may be used to decapsulate the various IP packets in the IP encapsulated signal 139 from the receiving unit. The output of decapsulation module 162 is a transport stream containing audio/video data, guide information, conditional access information, etc. A decoder module 166, such as an MPEG decoder, receives the transport signal from the decapsulation module 162 and decodes the signal. The decoded signal is provided to an output driver module 168. The output driver module 168 generates various audio and video signals 169 for the display 32 illustrated in FIGS. 1 and 2. A conditional access module 170 may be included in the receiving device 30. Conditional access module 170 may take the form of a conditional access card or other security device. Without a conditional access module 170, the system may not function. Under certain conditions, the conditional access module 170 may be completely removed from the system or moved to the tuner demodulator module 100 or the IP encapsulation and control module 102.

A channel selector module 172 may also be included within the device 30. The channel selector module 172 may generate a channel control signal to communicate the channel desired at the particular device. The channel control signal may be provided to the receiving unit. More specifically, the channel control signal may be provided to the microprocessor 142 module. The input to the channel selector may come from a remote control or push button.

Figure 4:
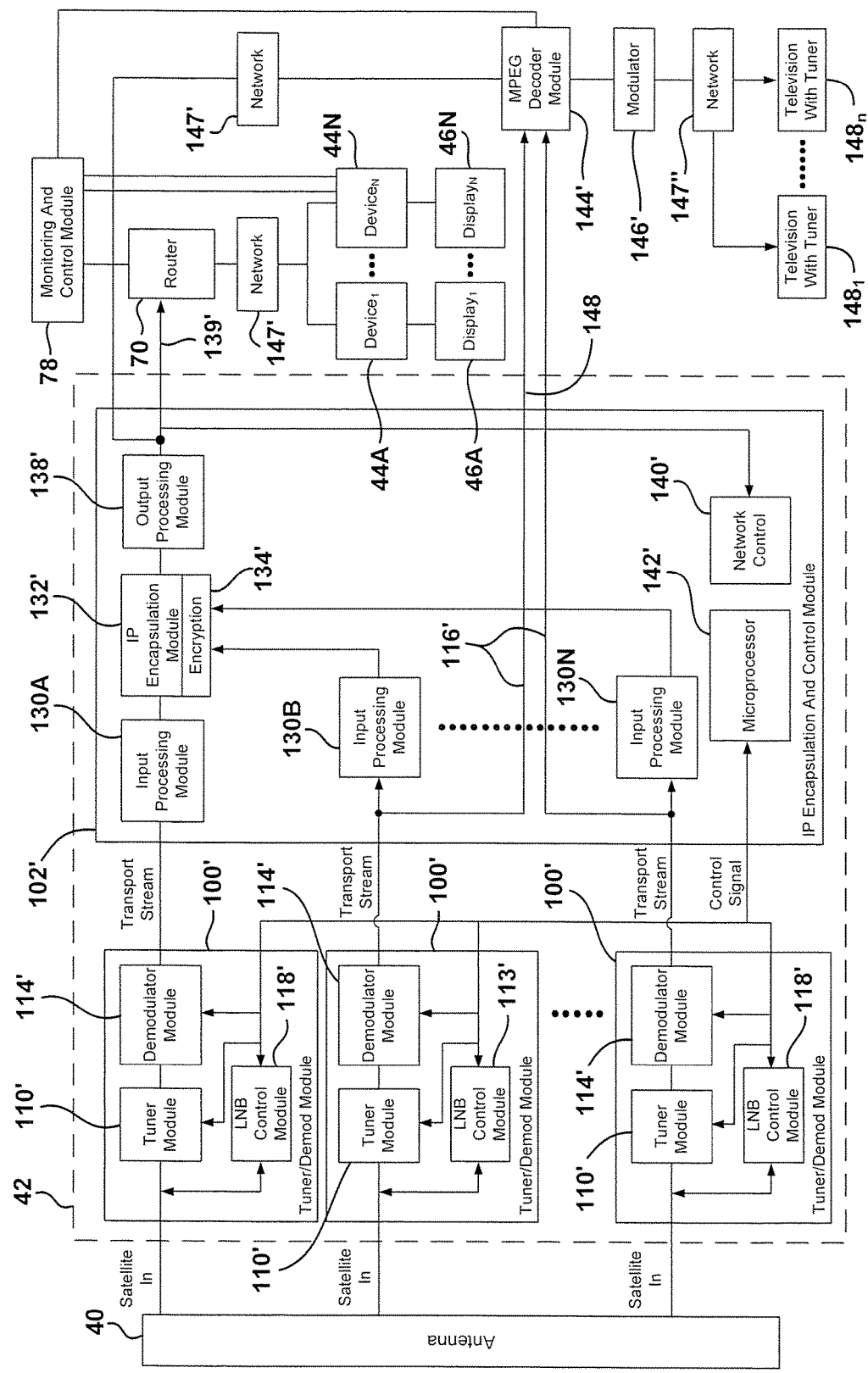
FIG. 4 is a block diagrammatic view of a receiving unit for a multiple device application.

Referring now to FIG. 4, the present disclosure may also be applicable to a system that includes a number of devices and a number of displays. Such a system may be suitable for multiple dwelling units, commercial buildings such as a bar or large single-family homes. In this example, one or more antennas may be coupled to a plurality of tuner demodulator modules 110'. Each of the tuner demodulator modules 110' may be configured identically to that described above in FIG. 2. Therefore, a separate description of the tuner demodulator modules 110' is not provided. Each of the tuner demodulator modules 110' generates a separate transport stream. The transport stream may correspond to one or more particular channel. The number of tuner demodulator modules 110' depends upon various parameters. For example, if each device 44A-44N may be tuned to a different channel, then a separate tuner demodulator module 110' may be provided for each respective device 44 up to and including the total number of unique transponders (satellite system) or RF frequencies (cable, terrestrial) used by the system. If less than each of the devices may be used at any one particular time, the number of tuner demodulator modules 110' may be accordingly reduced. Likewise, in a sports bar setting, only a few different channels may be required. Therefore, a small number of tuner demodulator modules 110' may be provided.

The receiving unit 42 may also include an IP encapsulation and control module 102'. The IP encapsulation and control module 102' may be modified from that shown above with respect to FIG. 2 to include multiple channel device capability. Each tuner demodulator 110' may include an input processing module 130A through 130N. As mentioned above, the input processing module 130A through 130N may act as a buffer to the IP encapsulation module 132'. Filtering may also be performed as mentioned above. A single IP encapsulation module 132' may be provided. The output of each input processing module 130A through 130N is communicated to the IP encapsulation module 132'. The IP encapsulation module 132' may also include encryption module 134' to encrypt the IP encapsulated bitstream in a similar manner to that described above with respect to FIG. 2. An output processing module 138', similar to that described above with respect to FIG. 2, may receive the IP encapsulation bitstream from the IP encapsulation module 132' and buffers the IP stream output 139. The network 147' may be used for communicating the IP stream. The network 147' may be configured similarly to the network 147 described above.

One advantage to the system set forth in FIG. 4 is that identical tuner demodulator modules 110 may be provided in either of the systems of FIG. 2 or 4. These modules may, thus, be mass produced and because of the economies of scale, the cost is reduced. Also, standard configurations of the IP encapsulation and control module 102' may also be formed. The example shown in FIG. 2 includes one set of circuitry used to drive one device 30. Of course, multiple devices using the same channel may be operated using the IP encapsulation and control module 102. The IP encapsulation and control module 102' illustrated in FIG. 4 may be mass produced in standardized format, such as one for 1 device, one for 4 devices, one for 8 devices, and one for 16 devices. Each of the variances may be mass produced and, thus, the overall cost of the system is reduced, decreasing the number of customer configurations. The circuitry of the IP encapsulation and control module 102 is essentially repeated with additional input processing buffers 130A through 130N.

A router 70 may or may not be included in the system. The router 70 may be a hard-wired router or a wireless router. The wireless router forms a wireless local area network (WLAN). The wireless local area network may be coupled to various devices including the wireless devices 56 represented by reference numbers 60-66 in FIG. 1.

The transport stream 116' from the tuner/demodulation module may also be provided. This may be passed through the IP encapsulation and control module or provided directly from the tuner/demodulator module 110'.

In this example, an MPEG decoder module 144' may receive the IP stream 139' through the network 147' or the transport stream 116'. The MPEG decoder module decodes the MPEG signal and provides an audio and video signal to the modulator 146'. Each signal received by the MPEG decoder module 144' may correspond to a different channel that is received and demodulated each tuner module 110' and demodulator module 114'. The modulator 146' receives the audio and video signals from the decoder 144' and modulates each with a different frequency. The modulated signals may be communicated through a network 147". Network 147" may be an analog network. Preferably, the frequencies of the modulated signals correspond to standard cable television frequencies so that each television 148' with tuner is able to demodulate the signals. This may occur with the internal cable television-type tuner without the user of an external set top box.

As can be appreciated, the present system may be used for a hotel, apartment building, or other system where multiple televisions will be connected. For a low-cost system, modulated signals may be provided to each television with tuner. This type of system may provide a "basic" system to various subscribers within the system. Should the subscribers desire more improved, higher quality or more channels, the IP portion of the system may be implemented. The IP system may be used together with the modulated analog system or the two systems may be used separately.

Again, a monitoring and control module 78 may be used to monitor or control various functions throughout the system. The monitoring and control module 78 may be in communication with router 70, the MPEG decoder module 144', one or more of the devices 44A-44N through the IP network 147'. Each of the devices has a web address that may be used to monitoring and controlling through the monitoring and control module 78.

Figure 5:
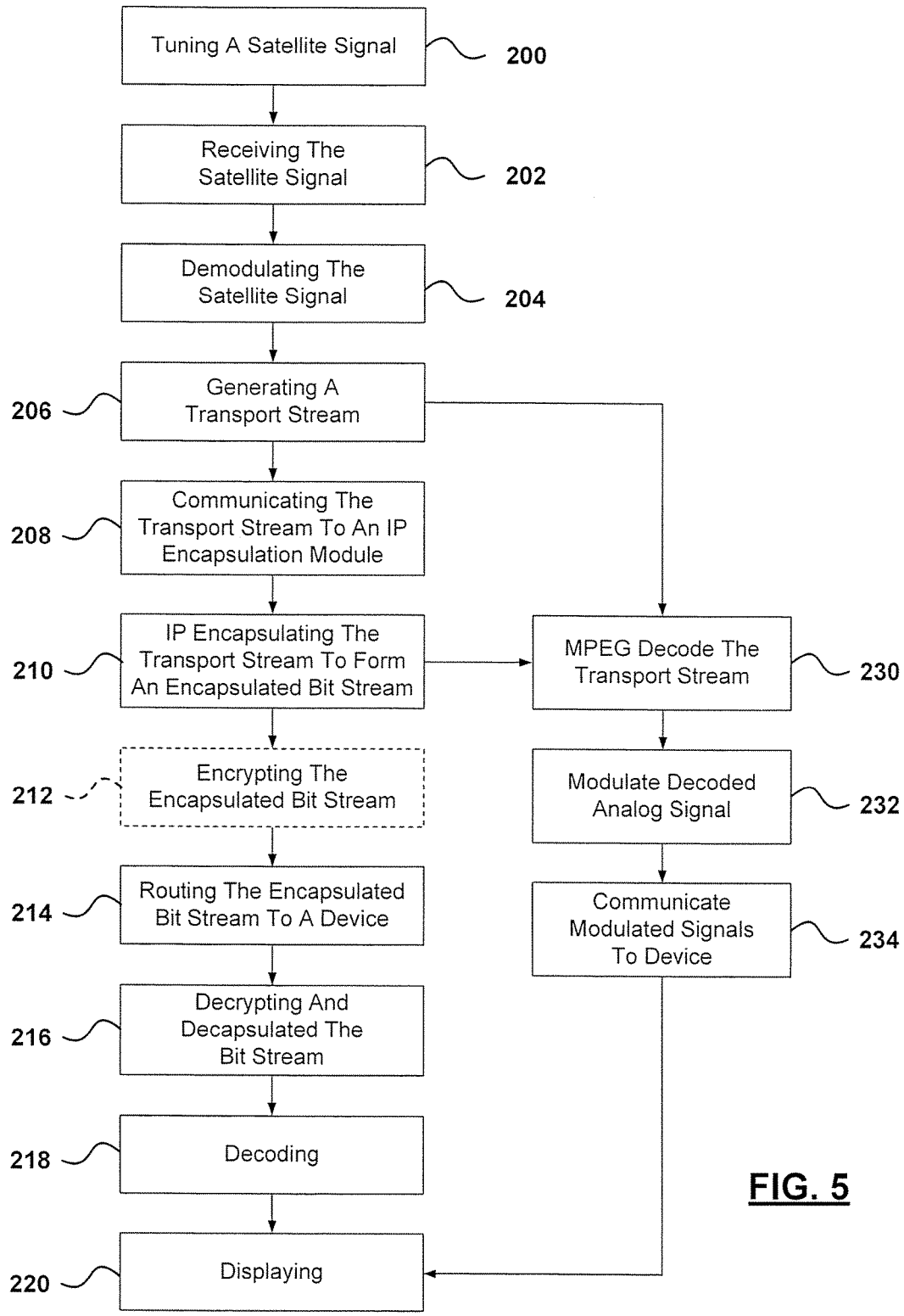
FIG. 5 is a flowchart of a method of receiving a signal according to one aspect of the disclosure.

Referring now to FIG. 5, a satellite signal is tuned in a tuner in step 200. As mentioned above, the signal may be a satellite signal or may also be some other terrestrial or cable television signal. In the following example, the satellite signal, rather than a cable or terrestrial signal, will be used. In step 202, the satellite signal is received. In step 204, the satellite signal is demodulated. A transport stream is generated in step 206. In step 208, the transport stream is communicated to the IP encapsulation module 132, 132' of FIGS. 2 and 4. The IP encapsulation module 132, 132' may be separated from the tuner demodulator module. In step 210, the transport stream is IP encapsulated to form an encapsulated bitstream.

If encryption is used in the system, step 212 encrypts the encapsulated bitstream. In step 214, the encapsulated bitstream is routed to a device. In step 216, if encrypting is used, the bitstream is decrypted. In step 216, the bitstream is also decapsulized.

In step 218, the bitstream is decoded. In step 220, the signal is displayed. The display may be an audio display or visual display.

It should be noted that some of the modules used in the above, such as the routers, IP encapsulating modules and the like, may also include some IP processing. The present examples provide additional processing to such devices.

Referring back to steps 206 and 210, the MPEG decoding for a modulated system may take place after steps 206 or 210. This was described above in reference to FIGS. 2 and 4. In step 230, the transport stream is MPEG-decoded. As mentioned above, the encapsulated transport stream may also be MPEG-decoded from step 210. Once decoded in step 230, an analog video and audio signal is formed. A signal for each channel may be formed. In step 232, the decoded analog signal is modulated. The modulated signals are communicated to the various devices through a network. The frequencies of each of the modulated signals may be different. As is mentioned above, the network may include a wireless network or a wired network such as a coaxial communication wired network. The network may pre-exist in a building.

While particular embodiments of the disclosure have been shown and described, numerous variations and alternate embodiments will occur to those skilled in the art. Accordingly, it is intended that the disclosure be limited only in terms of the appended claims.

What is claimed is:

1. A system comprising:
  a receiving unit comprising:
  a tuner module tuning a satellite signal;
  a demodulator demodulating the satellite signal to form a transport stream signal;
  an IP encapsulation module generating an IP encapsulated signal from the transport stream signal and communicating the IP encapsulated signal through a router and a network to a device controlling a display;
  a decoder module decoding the IP encapsulated signal to form an analog signal;
  a modulator modulating the analog signal to form a modulated signal and communicating the modulated signal to a television tuner through the network; and
  a web portal and a monitoring and control module coupled to the web portal, said monitoring and control module monitoring health and status of the receiving unit, the device and the router, said web portal configured to reset or reconfigure the receiving unit, the router and the device through the web portal and the router.

2. The receiving unit as recited in claim 1 further comprising an input processing module buffering the transport stream signal.

3. The receiving unit as recited in claim 1 further comprising an encryption module generating an encrypted IP encapsulated signal.

4. The receiving unit as recited in claim 1 further comprising an output processing module buffering the IP encapsulated signal.

5. A system comprising the receiving unit as recited in claim 1 and further comprising an IP network communicating the IP encapsulated signal from the IP encapsulation module to the decoder module.

6. A system comprising the receiving unit as recited in claim 1 and further comprising an analog network communicating the modulated signal to the television tuner.

7. The receiving unit as recited in claim 1 further comprising remotely monitoring and controlling a decoder module within a device located remotely from the IP encapsulation module through the web portal.

8. The receiving unit as recited in claim 1 wherein the tuner module comprises a plurality of tuner modules and the demodulator comprises a plurality of demodulators corresponding to a respective one of a plurality of channels.

9. The receiving unit as recited in claim 8 wherein the IP encapsulation module forming a plurality of IP encapsulated signals and the decoder module decodes the plurality of IP encapsulated signals into a plurality of analog signals.

10. The receiving unit as recited in claim 9 wherein the modulator modulates the plurality of analog signals.

11. The receiving unit as recited in claim 10 wherein the modulator communicates the plurality of analog signals to a plurality of television tuners.

12. A system comprising:
- a tuner demodulator module having a tuner module for tuning a satellite signal, a demodulator module demodulating the satellite signal to form a transport stream signal, and a low noise block control module for controlling a low noise block;
- an IP encapsulation and control module receiving the transport stream and formatting the transport stream signal to form an IP encapsulated signal and communicating the IP encapsulated signal through a router and a network, said IP encapsulation and control module forming a control signal for controlling the tuner and low noise block control module;
- a decoder in communication with the network receiving the IP encapsulated signal, said decoder decoding the IP encapsulated signal to form a decoded analog signal;
- a first user device receiving the decoded analog signal;
- a second user device receiving the IP encapsulated signal;
- a web portal and a monitoring and control module coupled to the web portal, said monitoring and control module monitoring health and status of the first user device, the second user device and the router, said web portal configured to reset or reconfigure the first user device, the second user device and the router through the web portal and the router.

13. The system as recited in claim 12 wherein the tuner module comprises a plurality of tuner modules and the demodulator comprises a plurality of demodulators corresponding to a respective one of a plurality of channels.

14. The system as recited in claim 13 wherein the IP encapsulation and control module forms a plurality of IP encapsulated signals and communicates the IP encapsulated signals to a plurality of devices.

15. The system as recited in claim 14 wherein the plurality of devices comprises a plurality of set top boxes.

\* \* \* \* \*